No. 642,676.  
Patented Feb. 6, 1900.
W. W. CARPENTER.
SEED DRILL.
(Application filed Feb. 10, 1899.)
(No Model.)
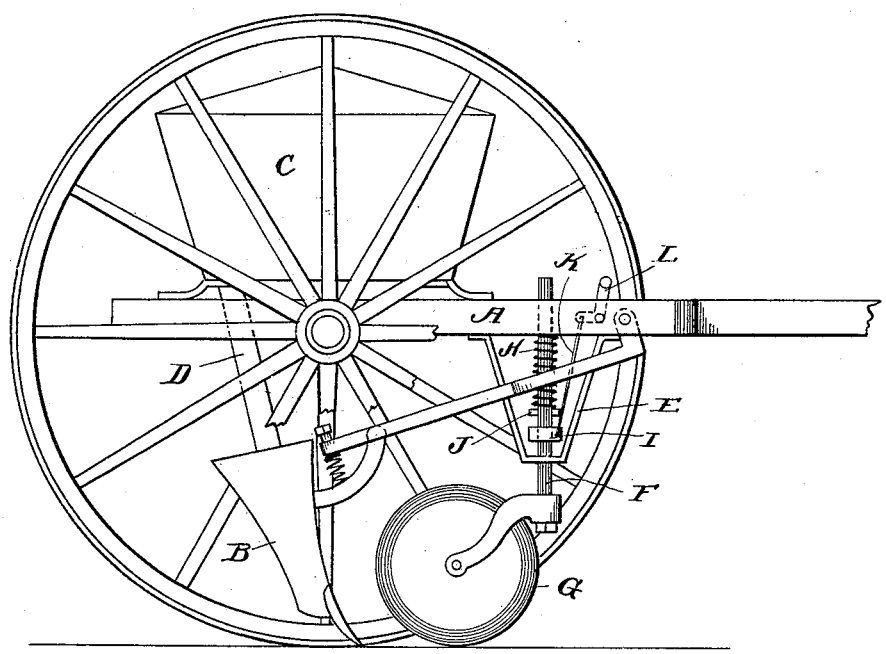
Witnesses  
Samuel Stuart  
A. Turner
Inventor  
William W. Carpenter  
By Geo. C. Hazelton  
Atty.

UNITED STATES PATENT OFFICE.

WILLIAM W. CARPENTER, OF NEW FRANKLIN, MISSOURI.

SEED-DRILL.

SPECIFICATION forming part of Letters Patent No. 642,676, dated February 6, 1900.

Application filed February 10, 1899. Serial No. 705,220. (No model.)

*To all whom it may concern:*

Be it known that I, WILLIAM W. CARPENTER, a citizen of the United States, residing at New Franklin, in the county of Howard and State of Missouri, have invented a certain new and useful Improvement in Seed-Drills, of which the following is a specification.

My invention relates to a new and useful improvement in seed-drills, and has for its object to combine with an ordinary drill-shoe a disk colter in such manner as to open the ground and lead the way for the shoe to follow, and thus overcome the disadvantages which have heretofore existed in connection with the use of such a drill.

With these ends in view the invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawing, forming a part of this specification, in which the machine is shown in side elevation.

A represents the frame of an ordinary seed-drill, to which is attached a series of drill-tubes B, adapted to receive the grain fed from the hopper C through the spout D. A series of brackets E are arranged beneath the frame and have journaled therein the caster-spindles F, carrying at their lower extremities disk colters G. There should be one of these colters for each drill-tube and so located as to travel immediately in front of the tooth carried by the drill-tube. A spring H is arranged around each caster-spindle, so as to press the latter downward, and thereby cause the colter to cut a furrow in the ground when the drill is drawn forward, and it is to be noted that each of these colters is independent, and the action of the springs will permit each colter to rise or fall in passing over obstructions without interfering with the others.

For convenience in raising all of the colters out of action when necessary a bar I is provided, through which each spindle passes, and this bar when drawn upward will come in contact with the pins J, and any further upward movement of the bar will lift the spindles and consequently the colters. Any suitable mechanism may be provided for the lifting of this bar—as, for instance, a rod K, connecting with a lever L, suitably placed to be in easy reach of the driver. In practice this combination of tooth-drills and drill-tube colters has been found to be exceedingly advantageous in that the disadvantages met with in the use of the tooth-drill are overcome—as, for instance, the hoe-drill will not cut its way through cornstalks, weeds, and the like that may be on the ground, and when such obstructions are met with the machine is soon clogged and it becomes necessary to either raise all of the drills out of the ground or to stop and remove the weeds; but by the use of my disk colter in combination with the hoe cornstalks, weeds, clods, and the like are cut and a path provided for the following of the hoe, and, as is well known, the hoe-drill is the most effective form of drill so long as not obstructed by cornstalks and the like.

Of course I do not wish to be limited to any particular construction of hoe-drill or disk colter; neither do I wish to be limited as to the manner of attaching the colters to the machine, since these may be varied to suit the fancy or requirements of each manufacturer or purchaser.

The forks of the disk colters are preferably attached to the spindles in such manner that they may be readily removed.

Having thus fully described my invention, what I claim as new and useful is—

1. In a device of the character described, a drill having suitable tubes, spring-pressed caster-spindles, colters on the lower ends of the caster-spindles, brackets forming guides for the spindles, pins transversely of the spindles and a lifting-bar through which the spindles operate, and means for elevating the lifting-bar whereby the pins of the shanks are engaged.

2. In a device of the character described, a drill-tube having teeth, colters traveling in front of the teeth, caster-spindles on which the colters are mounted, brackets for the spindles forming guides, a lifting-bar through which the spindles slide, pins transversely of the spindles and protruding therefrom abutted by the lifting-bar and springs on the spindles between the pins and the frame.

In testimony whereof I have hereunto affixed my signature in the presence of two subscribing witnesses.

WILLIAM W. CARPENTER.

Witnesses:
A. TURNER,
C. C. ALSOP.